United States Patent [19]

Shephard

[11] 3,999,265

[45] Dec. 28, 1976

[54] CIRCULAR CUT-OFF BLADE

[75] Inventor: Donald L. Shephard, Memphis, Mich.

[73] Assignee: Helen I. Shephard, Memphis, Mich.; a part interest

[22] Filed: Jan. 12, 1976

[21] Appl. No.: 648,072

[52] U.S. Cl. .................................. 29/95 R; 29/98; 29/101

[51] Int. Cl.² ......................................... B26D 1/00

[58] Field of Search .......... 29/95 R, 98, 101, 102 R

[56] References Cited

UNITED STATES PATENTS

| 1,738,912 | 12/1929 | Luers .............................. 29/95 R |
| 2,329,872 | 9/1943 | Brownlee .......................... 29/101 |

FOREIGN PATENTS OR APPLICATIONS

| 453,005 | 11/1948 | Canada ........................... 29/102 R |
| 718,805 | 1/1932 | France ............................ 29/101 |

*Primary Examiner*—Leonidas Vlachos
*Attorney, Agent, or Firm*—Cullen, Settle, Sloman & Cantor

[57] ABSTRACT

The circular cut-off blade includes an arcuate body of about 90°–180° approximately in length and having parallel sides, and a continuous arcuate enlarged head along one side edge of the body throughout its length, said body and head being of uniform cross section. The opposed side walls of the head and its top surface being transversely concave and hollow ground to define therebetween continuous cutting corners. The leading edge face of the body and head being cut away inwardly and rearwardly to define a clearance angle with said leading edge face defining with said head an arcuate cutting edge. Said body and head after wear of its cutting edge adapted for progressive grinding of its clearance angle leading edge face to provide a progressive series of cutting edges along the length of said blade.

1 Claim, 3 Drawing Figures

CIRCULAR CUT-OFF BLADE

BACKGROUND OF THE INVENTION

In the cutting off of stock in a lathe, hand screw machine and automatic screw machine using a conventional cut-off blade, the usual practice is to provide an elongated blade for this purpose for providing transverse radial cut into the workpiece or for cutting off lengths thereof. As the cut-off blade wears, from time to time it is ground across its leading edge to provide new cutting edges.

SUMMARY OF THE INVENTION

It is an object of the present invention to provide an improved cut-off blade which is arcuate in form in the range of 90°–180°, preferably 180° and which includes an body and an enlarged head and including a leading edge face having a clearance angle which upon wear, may be reground to provide additional cutting edges along the arcuate length of the tool body.

It is another object to provide a compact circular cut-off blade which utilizes less space and provides longer life for the cut-off blade.

These and other objects will be seen from the following specification and Claims in conjunction with the appended drawing.

THE DRAWING

DETAILED DESCRIPTION OF THE INVENTION

Figure 1:
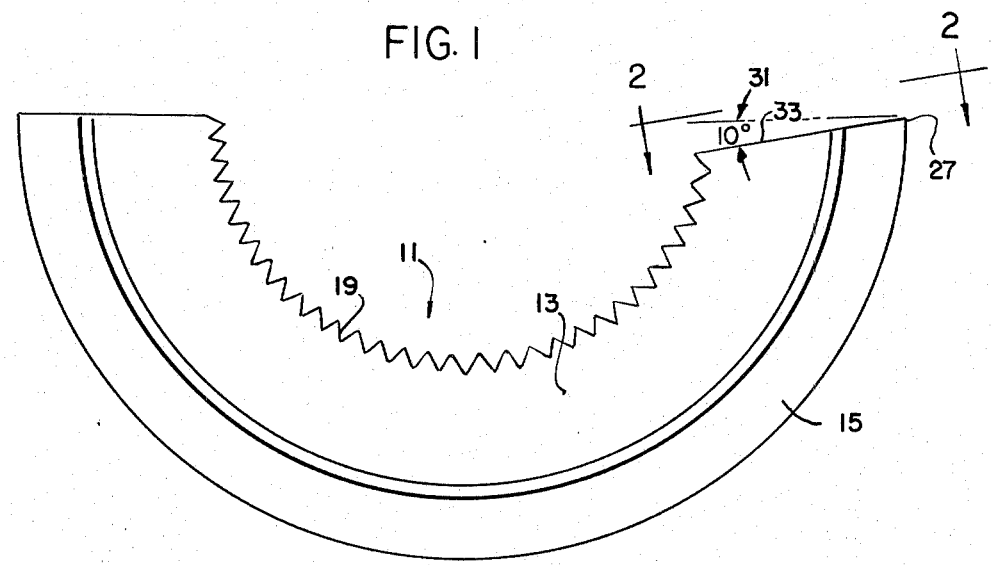
FIG. 1 is a side view of the present circular cut-off blade on an enlarged scale.

The present circular cut-off blade is of the type shown in U.S. Pat. Nos. 2,688,791; 2,176,265; 2,344,442; 1,738,912; and 3,140,627.

Referring to the drawing, the present circular cut-off blade is generally indicated at 11 and in the preferred form has an arcuate body 13 of about 180° in length. It is contemplated that the length could range between 90°–180° approximately. A corresponding arcuate head 15 projects from one side edge of the body, the body and head being of uniform cross section throughout its length, such as defined in FIG. 2.

Said body is constructed of a tool steel and has opposed parallel sides 17. Along the inner arcuate edge of the body, there are formed a series of transverse serrations 19 to facilitate the anchoring of the present cut-off blade within a suitable tool holder.

Figure 3:
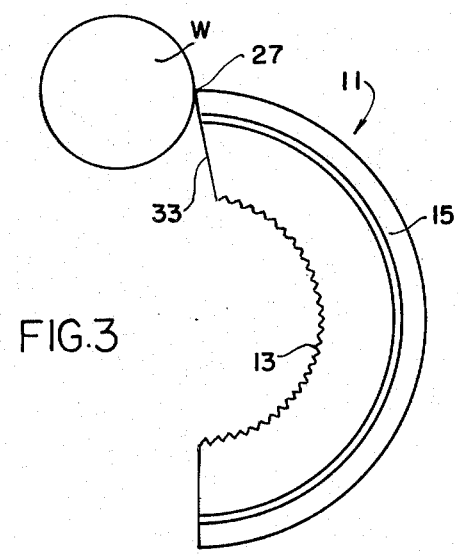
FIG. 3 is a schematic side elevational view showing the relationship of the cut-off blade to a rotatable workpiece.

The tool holder would be of a conventional type which would present the circular cut-off blade to a rotatable workpiece W, FIG. 3, for radial cuts thereinto transversely of the longitudinal axis of said workpiece.

Figure 2:
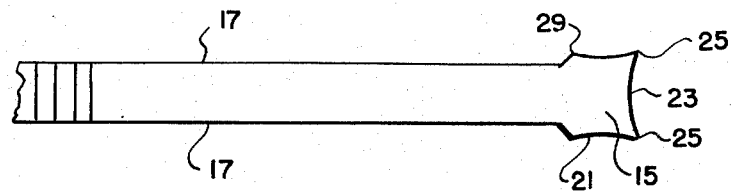
FIG. 2 is an end view thereof taken in the direction of arrows 2—2 of FIG. 1.

The opposed sides 21 of said head are transversely concave and hollow ground, as shown at FIG. 2. The elongated arcuate top edge 23 of said head is transversely concave throughout its length and also hollow ground.

The hollow ground surfaces 21 and 23 together provide therebetween the elongated continual outer cutting corners 25 which extend throughout the length of the head.

The forward leading edge as at 33 of the body and head is cut radially inward and rearwardly of said edge face to provide the clearance angle 31 to facilitate cutting and proper presentation of the leading cutting edge 27 with respect to the workpiece, such as shown in FIG. 3.

This clearance angle is in the range of approximately 10° and 20° provide a leading edge face 33, which in cooperation with said head and its concave surface 23 provides the arcuate cutting edge across the end of the blade.

The respective head sides 21 are generally inclined radially inward towards each other adjacent the body to provide at their ends the relief corners 29 which are spaced apart a distance shorter than the outer cutting corners 25 to thereby provide an additional clearance as the cut-off blade is fed transversely into the workpiece W, FIG. 3, and to prevent the building up of cut chips therebeween.

The advantage is that it cuts irregularly shaped chips from the workpiece which are similarly curved, and under the heat of the cutting operation, have a tendency to explode outwardly of the tool being cut and the workpiece to prevent over-heating.

Similarly, the advantage of the hollow ground sides 21 and the clearance relief corners 29 fit to provide clearance space within the groove cut and the workpiece also to prevent over-heating and prevent lodgement of chips in the groove being cut for the cut-off operation or grooving operation.

As the transverse leading cutting edge 27 wears, from time to time, the edge face 33 which includes the body and the head may be ground in planes parallel to face 33 progressively throughout a considerable portion of the length of the body to provide successively new cutting edges as at 27 and maintaining the relief angle 31 for the most efficient operation of the cut-off blade.

The present arcuate or circular cut-off blade is adapted to be mounted within a suitable tool holder of any conventional type which rigidly holds the cut-off blade to the relative position shown in FIG. 3 with respect to the workpiece and wherein, the blade is adapted to be fed transversely of the workpiece axis for the cut-off or grooving operation.

The transverse serrations 19 upon the inner arcuate edge of the body serve to provide improved anchoring of the blade within a suitable tool holder.

Having described my invention, reference should now be had to the following claims.

I claim:

1. A circular cut-off blade comprising an arcuate body of about 180° approximately in length, and having parallel sides:

and an exterior continuous arcuate enlarged head of maximum diameter along one side of the body throughout its length; as an integral part of the body, said body and head being of uniform cross-section;

the opposed side walls of the head being transversely concave along its length and hollow ground;

the outer face of the head being transversely concave along its length and hollow ground, and forming with said side walls continuous cutting corners;

the leading edge face of said body and head being cut away inwardly and rearwardly of a radial line defining a clearance angle;

said leading edge defining with said head an arcuate cutting edge; at the maximum diameter said blade adapted for mounting within a tool holder so as to present said cutting edge at approximately a right angle to the axis of a rotatable workpiece for a radial cut thereinto; and said body and head after wear of its cutting edge being adapted for progressive grinding of its clearance angle leading edge face to provide a progressive series of cutting edges along the length of said blade, and a series of transverse serrations along the other side of the body throughout its length.

* * * * *